(12) United States Patent
Herrmann

(10) Patent No.: US 7,070,225 B2
(45) Date of Patent: Jul. 4, 2006

(54) INDUSTRIAL TRUCK WITH A LATERAL FRAME OPENING AND A FRAME-REINFORCING DOOR

(75) Inventor: Udo Herrmann, Johannesberg (DE)

(73) Assignee: Linde Aktiengesellschaft, Wiesbaden (DE)

( * ) Notice: Subject to any disclaimer, the term of this patent is extended or adjusted under 35 U.S.C. 154(b) by 19 days.

(21) Appl. No.: 10/941,647

(22) Filed: Sep. 15, 2004

(65) Prior Publication Data

US 2005/0093335 A1     May 5, 2005

(30) Foreign Application Priority Data

Sep. 16, 2003   (DE)   ................. 103 42 660

(51) Int. Cl.
*B60J 5/04* (2006.01)
*E05B 15/02* (2006.01)

(52) U.S. Cl. ............... 296/146.6; 296/190.03; 296/187.12; 292/341.15

(58) Field of Classification Search ............. 296/146.6, 296/187.03, 187.12, 193.02, 193.05, 193.06, 296/203.01, 203, 190.11, 190.08; 292/341.15, 292/89, 341.17, 87, 303; 49/394
See application file for complete search history.

(56) References Cited

U.S. PATENT DOCUMENTS

| | | | |
|---|---|---|---|
| 4,432,424 A * | 2/1984 | Abels et al. ................ 180/6.48 |
| 4,531,615 A * | 7/1985 | Wible ......................... 187/227 |
| 4,679,841 A * | 7/1987 | Taunay ......................... 296/76 |
| 4,700,983 A * | 10/1987 | Kinaga et al. .......... 296/146.11 |
| 4,781,260 A * | 11/1988 | Morita et al. ............. 180/89.12 |
| 5,074,611 A * | 12/1991 | Newkirk .................. 296/146.6 |
| 5,286,081 A * | 2/1994 | Martin, Jr. .............. 296/190.08 |
| 5,431,476 A * | 7/1995 | Torigaki ................. 296/187.12 |
| 5,806,917 A * | 9/1998 | Townsend ................... 296/202 |
| 5,908,216 A * | 6/1999 | Townsend ................ 296/146.6 |
| 6,053,565 A * | 4/2000 | Cho ....................... 296/187.12 |
| 6,220,652 B1 * | 4/2001 | Browne et al. ......... 296/187.12 |
| 6,637,807 B1 * | 10/2003 | Gotz ...................... 296/203.01 |
| 6,663,166 B1 * | 12/2003 | Achleitner ............... 296/146.6 |
| 6,846,033 B1 * | 1/2005 | Chu et al. ................ 296/146.6 |
| 2003/0070860 A1 | 4/2003 | Gotz |
| 2003/0168902 A1 | 9/2003 | Wiener et al. |

FOREIGN PATENT DOCUMENTS

| JP | 112554972 | 9/1999 |
|---|---|---|
| JP | 2002167181 | 6/2002 |
| JP | 2002167181 | 4/2003 |

* cited by examiner

*Primary Examiner*—D. Glenn Dayoan
*Assistant Examiner*—Greg Blankenship
(74) *Attorney, Agent, or Firm*—The Webb Law Firm

(57) ABSTRACT

An industrial truck, such as a counterweight fork-lift truck, has a vehicle frame (1) with a frame portion (2) configured to receive a battery block. The frame portion (2) has at least an upper frame opening (2*a*) and a lateral frame opening (2*b*). The lateral frame opening (2*b*) can be covered by a door (3) pivotable about a substantially vertical axis (A). The door (3) is configured to reinforce the frame and can be locked in the closed position by a force-transmitting locking unit (4). The locking unit (4) can have a force-transmission element (5) which receives tensile and pressure forces and can be adjusted in the longitudinal and height direction.

14 Claims, 9 Drawing Sheets

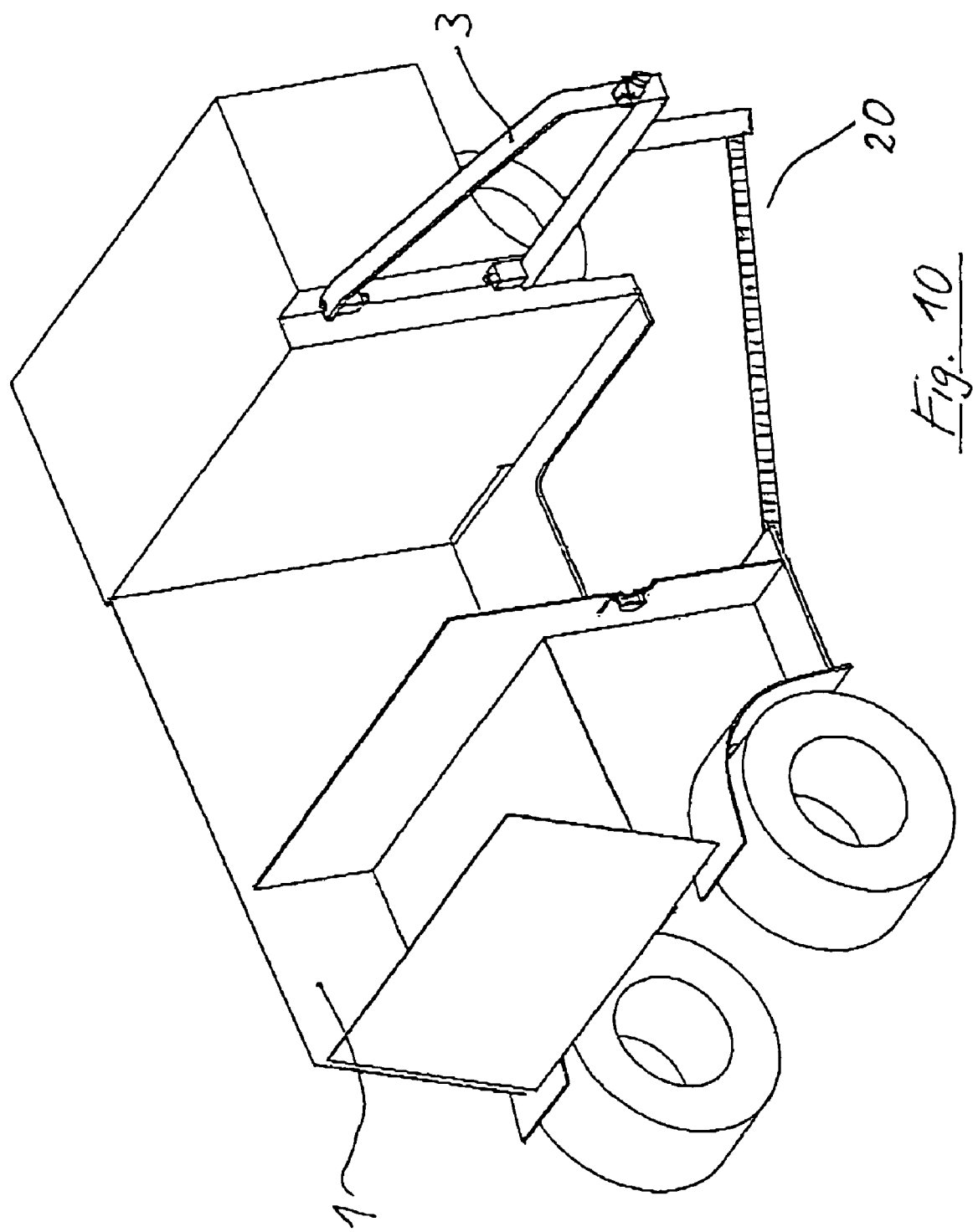

INDUSTRIAL TRUCK WITH A LATERAL FRAME OPENING AND A FRAME-REINFORCING DOOR

CROSS REFERENCE TO RELATED APPLICATION

This application claims priority to German Application No. 103 42 660.4 filed Sep. 16, 2003, which is herein incorporated by reference in its entirety.

BACKGROUND OF THE INVENTION

1. Field of the Invention

The invention relates to an industrial truck, such as a counterweight fork-lift truck, having a vehicle frame that comprises a frame portion configured to receive a battery block and upper and lateral frame openings. The lateral frame opening can be covered by a door that can be pivoted about a substantially vertical axis.

2. Technical Considerations

A generic industrial truck is shown in DE 101 45 991 A1. In this industrial truck, the battery block can be removed upwardly by a loading gear from the frame portion, namely through the upper frame opening. As an alternative to this, it is also possible to open the side door and remove the battery block laterally to change the battery. Owing to the openings in the frame portion, both laterally and at the top, it is difficult to construct the vehicle frame of the generic industrial truck so that it deforms as little as a vehicle frame which only has a single battery removal opening. Vibrations and elastic displacements within the vehicle frame can occur, for example, when a vehicle with the rear-side counterweight collides with an obstacle while maneuvering.

Therefore, it is an object of this invention to provide an industrial truck of the general type mentioned above but in which the vehicle frame has improved stability.

SUMMARY OF THE INVENTION

This object is achieved according to the invention in that the door is configured to reinforce the frame and can be locked in the closed position by a force-transmitting locking unit.

The door thus acts as part of the vehicle frame in the closed position. This assumes a correspondingly solidly designed construction of the elements involved, i.e., the door, door hinge, and locking unit. Despite the presence of a plurality of frame openings, the vehicle frame of the industrial truck of the invention is highly stable when the door is closed. Deformations and oscillations of the vehicle frame are minimized.

According to one embodiment of the invention, the locking unit has a force-transmission element absorbing tensile and pressure forces.

If the locking element has a second force-transmission element, vertically spaced from the first force-transmission element, torsional forces can also be absorbed.

The force-transmission element can expediently be adjusted in the longitudinal and/or height directions. The locking unit can therefore be adjusted to compensate for tolerances and substantially achieve freedom from play.

In a development of the invention, the force-transmission element has a screwed pin connected to the door. A locking pin is screwed onto the end of the screwed pin remote from the door. The locking pin can be provided for engagement with the vehicle frame or a component connected thereto and thus can be fixable in the longitudinal direction of the vehicle.

This mode of construction gives rise to only small outlay and is nevertheless functionally reliable and dependable. The locking unit can be easily and quickly adjusted once the pin has been released.

In order to lock the door in the closed position with minimal outlay, it is proposed that the locking unit has a leaf spring which can be elastically deformed in the longitudinal direction of the vehicle and is fastened to the vehicle frame such that when the door is in the closed position, fixes the locking pin in the transverse direction.

The door can therefore be locked in the closed position in a user-friendly manner by a simple leaf spring. In order to release the door again from the closed position, the leaf spring can be elastically bent in the direction of travel, whereby the lateral fixing of the locking pin and therefore of the pin-shaped force-transmission element is released and the door can be pivoted out of the closed position.

It has been proven to be advantageous if an active element that automatically bends the leaf spring upon closing is fastened to the door.

When the door is being locked, the leaf spring does not have to be deformed by hand and this simplifies the closing and locking process.

Instead of the described embodiment with a leaf spring, it is also possible for the locking unit to have a lock.

In this context, an embodiment is favorable in which the lock can be unlocked by means of a Bowden cable.

According to an embodiment which is advantageous with regard to minimizing outlay, the lock can be provided with a latch fixed to the frame which, in the closed position of the door, can be brought into engagement with an axial extension of the force-transmission element acting as a closing member.

A design of the invention in the form of the industrial truck proves particularly advantageous if the frame portion has a lower frame opening directly adjoining the lateral frame opening. In a mode of construction of this type of the vehicle frame, it is naturally more difficult to minimize oscillations and deformations of the vehicle frame during operation than in a construction which only has an upper and lateral frame opening. It is for this reason that the frame-reinforcing function of the closed door advantageously emerges here to a greater extent.

Owing to the frame-reinforcing, relatively stable construction of the door, a development of the invention proves advantageous in which the door is coupled to an articulated tie rod which is pivotally fastened to the vehicle frame and acts to limit movement in a right-angled open position of the door.

The door can, therefore, serve as an aid for inserting a battery block that is suspended on a loading gear. The articulated tie rod thus limits the opening angle of the door and prevents the door moving beyond an opening angle of about 90 degrees. A damping device may be incorporated in the articulated tie rod.

As an alternative to using an articulated tie rod, it is also possible for the door to be coupled to a belt which is fastened to the vehicle frame and acts to limit movement in a right-angled open position of the door.

BRIEF DESCRIPTION OF THE DRAWINGS

Further advantages and details will be described in more detail with the aid of the embodiment shown in the schematic figures, in which:

FIG. 10 shows a perspective view of an industrial truck of the invention with a belt with the door open.

DESCRIPTION OF THE PREFERRED EMBODIMENTS

Figure 1:
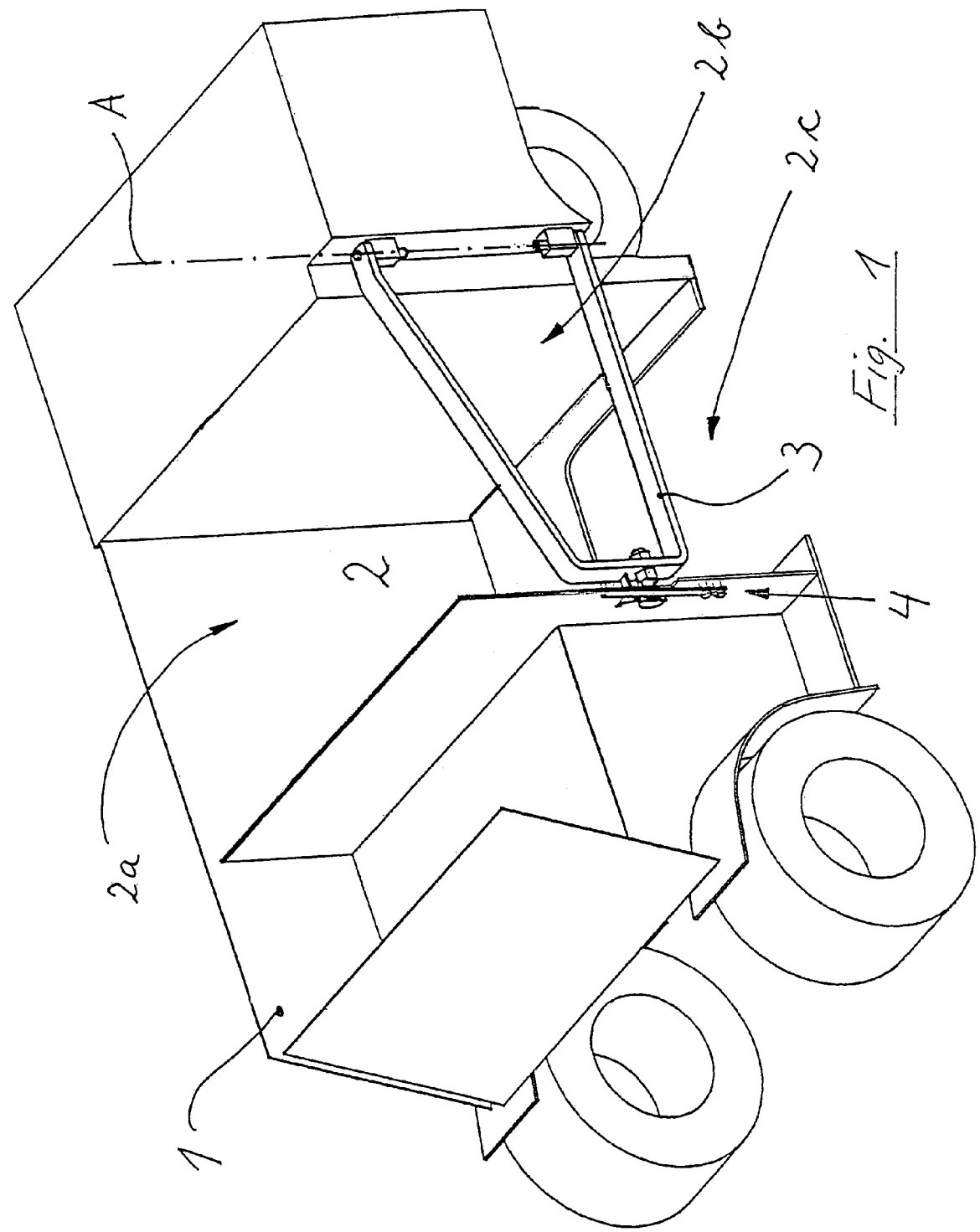
FIG. 1 shows a perspective view of an industrial truck incorporating features of the invention.

An industrial truck according to the invention has a vehicle frame 1 with a central frame portion 2, which is provided to receive a battery block (not shown). In order to be able to assemble and remove the battery block, the central frame portion 2 has an upper frame opening 2a and a lateral frame opening 2b.

A lower frame opening 2c, which adjoins the lateral frame opening 2b, is also provided and is used to allow the fork prongs of a second industrial truck to travel underneath the battery block located in the industrial truck and move it laterally out of the central frame portion 2 of the vehicle frame 1.

The lateral frame opening 2b can be closed by a door 3 which can be pivoted about a vertical axis A. The door 3, in the illustrated embodiment, is shown as an open profile construction without cladding. However, a closed design can be provided, such as a profile construction with sheet metal or plastics material cladding or a sheet metal shell construction with incorporated reinforcement profiles.

In the closed position, the door 3 is in active engagement with a locking unit 4 and has a frame-reinforcing function owing to its mode of construction and locking by the locking unit 4.

Figure 2:
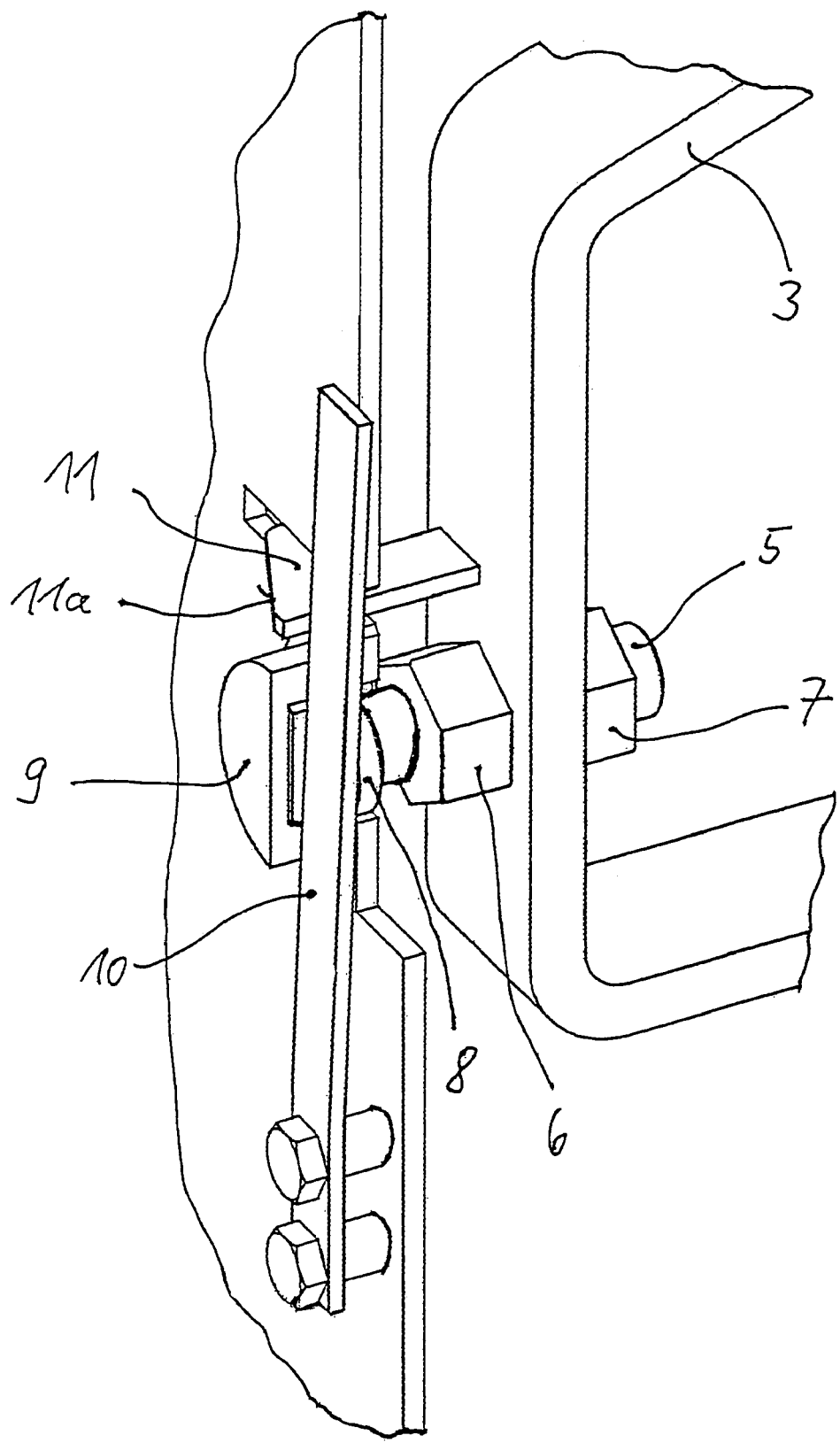
FIG. 2 shows an enlarged perspective view of a locking unit of the invention.
Figure 3:
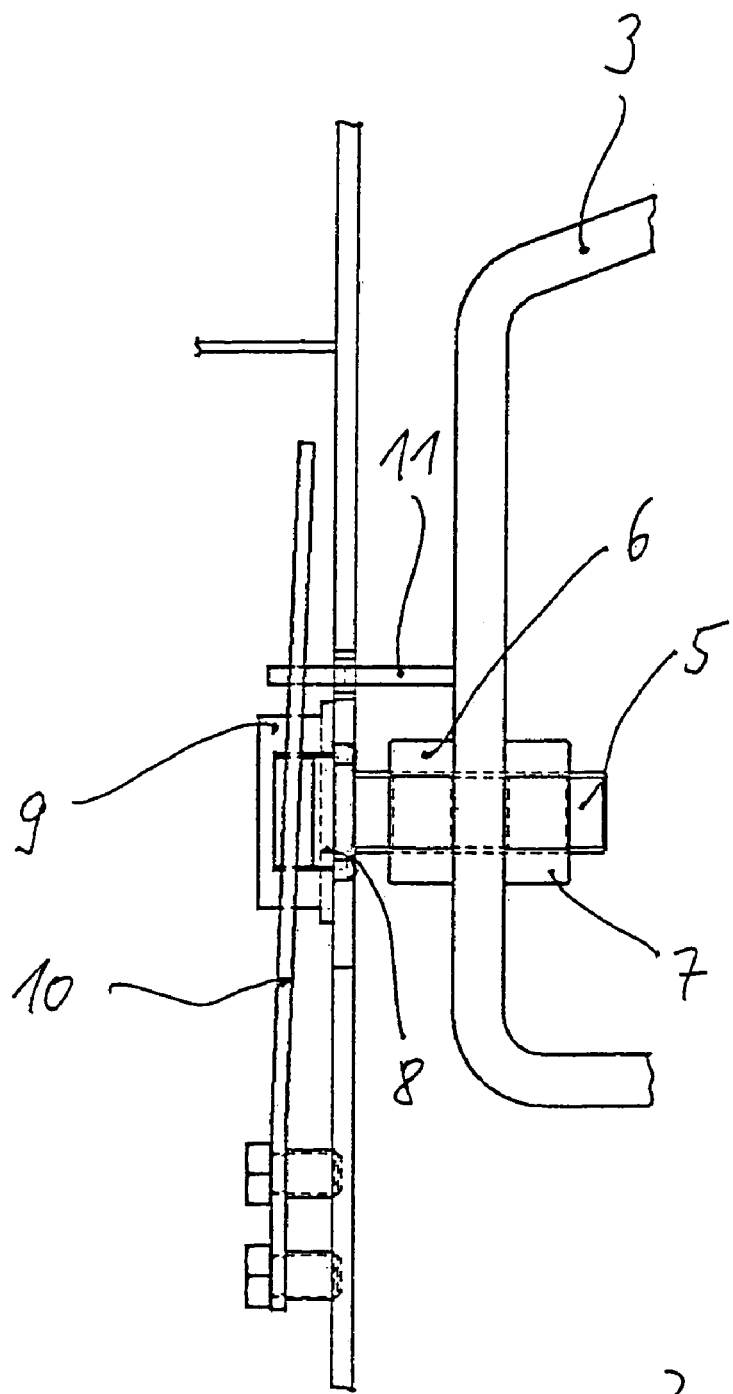
FIG. 3 shows a side view of the locking unit of FIG. 2.
Figure 4:
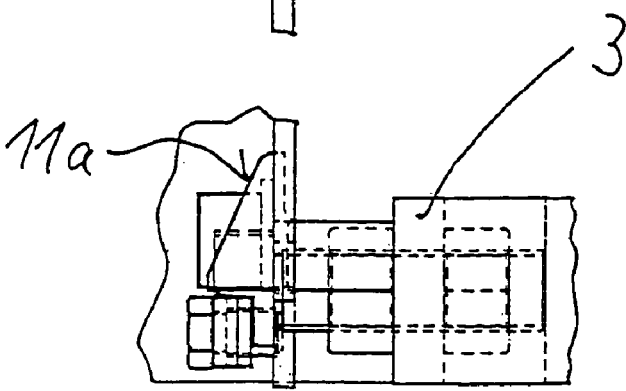
FIG. 4 shows a plan view of the locking unit of FIG. 2.

FIGS. 2, 3, and 4 show a possible mode of construction of the locking unit 4. A force-transmission element 5, which in the illustrated exemplary embodiment is configured as a screwed pin, is connected to the door 3 by means of two nuts 6, 7. A locking pin 8 is screwed onto the end of the force-transmission element 5 remote from the door and, when the door 3 is closed, is located in a receiving cup or pot 9 connected to the vehicle frame 1 and is then fixed in the longitudinal direction of the vehicle. This arrangement can be loaded by tension and pressure, so the door 3 takes part in the force-transmission in the vehicle frame 1 and its deformations are minimized.

In order to lock the door 3 in the locking state, a vertically arranged leaf spring 10 is provided which is connected to the vehicle frame 1 and can be elastically deformed in the longitudinal direction of the vehicle. The leaf spring 10 acts together with the locking pin 8 and fixes it in the lateral direction. If the leaf spring 10 is bent forwards in the longitudinal direction of the vehicle, the locking pin 8 together with the force-transmission element 5 is freed and the door 3 can be pivoted out of the closed position.

In order to allow automatic latching of the locking unit 4, an active element 11 is connected to the door, which active element 11 cooperates with the upper end of the leaf spring 10. An obliquely arranged face 11a, with the aid of which the leaf spring 10 is firstly bent forwards when the door 3 is closed, is provided for this purpose. On reaching the end position of the door 3, the face 11a of the active element 11 releases the leaf spring 10 again so that it springs back into its starting position and laterally fixes the locking pin 8 together with the force-transmission element 5 and therefore locks the door 3 in the closed position.

Figure 5:
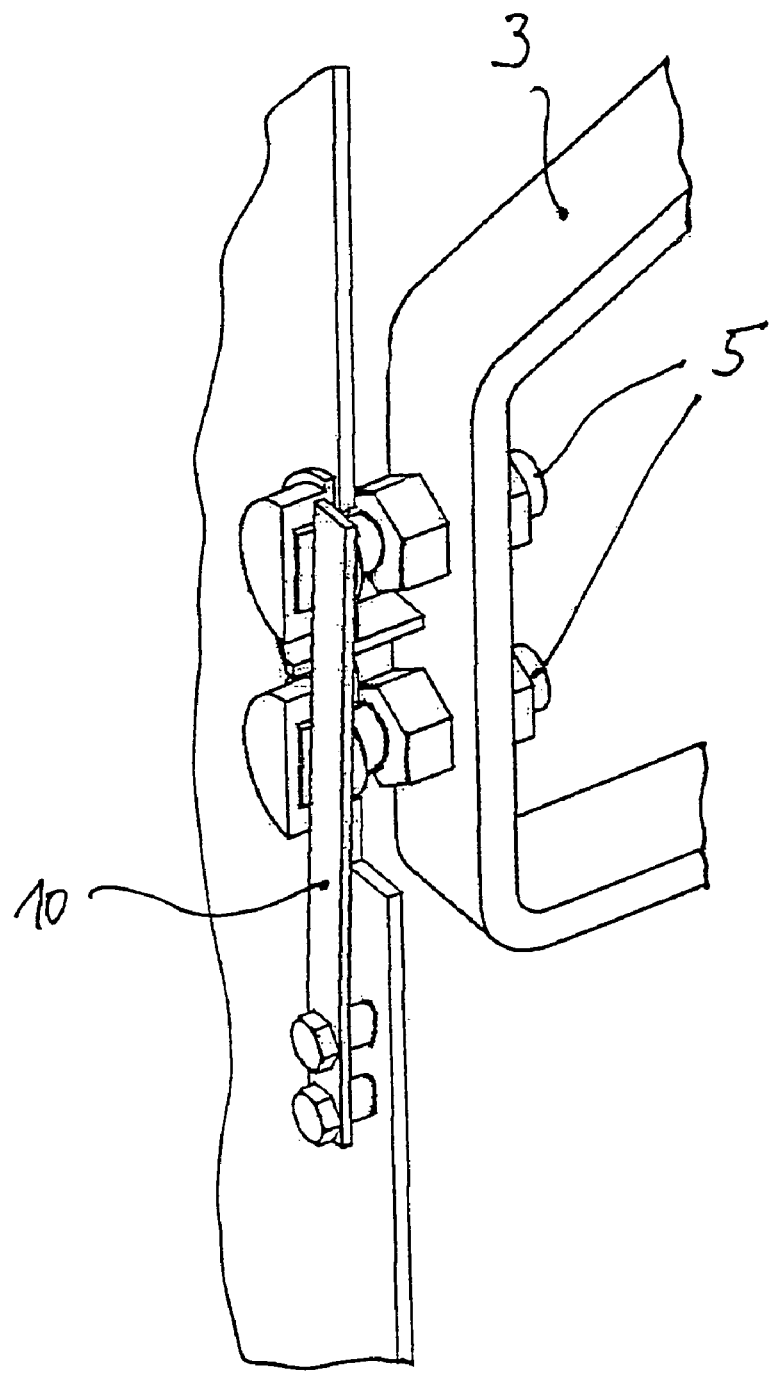
FIG. 5 shows a perspective view of a first variant of the locking unit.

In the variant of the embodiment shown in FIG. 5, two force-transmission elements 5 arranged vertically one above the other are provided. Thus, not only tensile and pressure forces, but also torsional forces, can be absorbed by the locking unit 4. A mechanism for automatic bending of the leaf spring 10 is not shown in this embodiment, but may certainly be provided, however.

Figure 6:
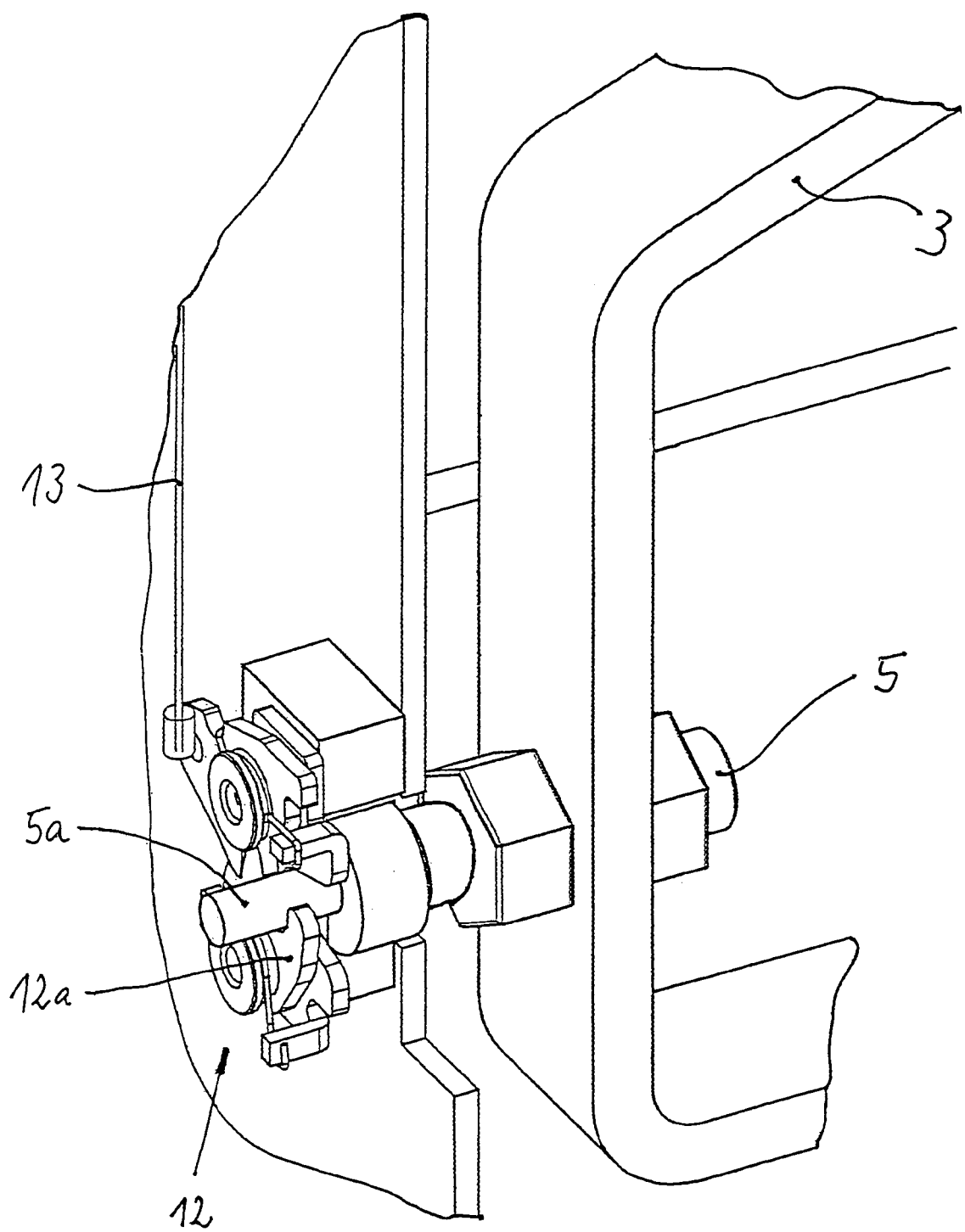
FIG. 6 shows a perspective view of a second variant of the locking unit.

In the embodiment illustrated in FIG. 6, instead of the leaf spring 10, a lock 12 is provided having a latch 12a fixed to the frame. The latch 12a can be brought into engagement with an axial extension Sa of the locking pin 8. The lock 12 can be unlocked by means of a Bowden cable 13.

Figure 7:
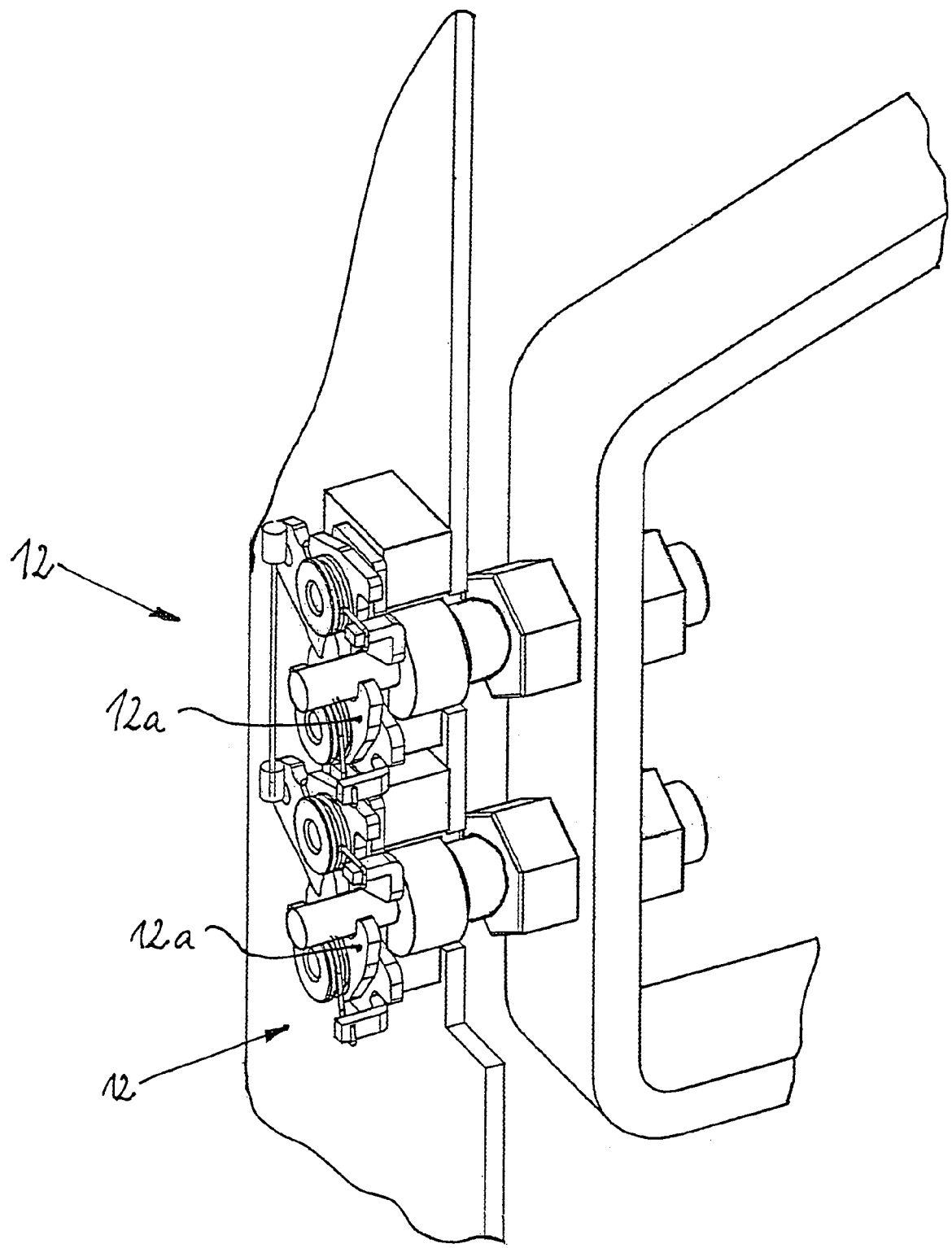
FIG. 7 shows a perspective view of a third variant of the locking unit.

The embodiment shown in FIG. 7 is similar to the embodiment shown in FIG. 6 but two locks 12 are provided, the latches 12a of which can be unlocked by a common Bowden cable.

Figure 8:
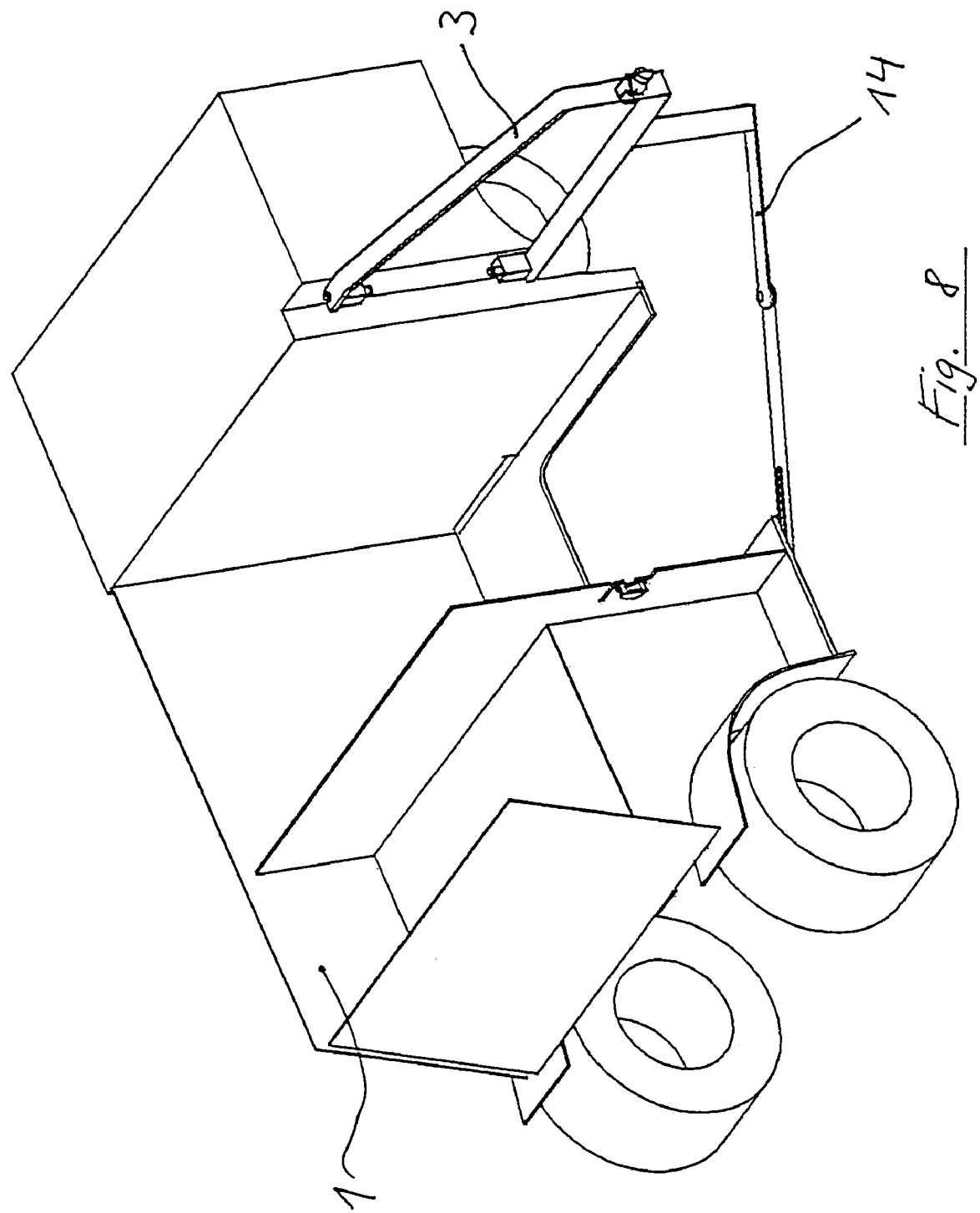
FIG. 8 shows a perspective view of an industrial truck of the invention with an articulated tie rod with the door open.
Figure 9:
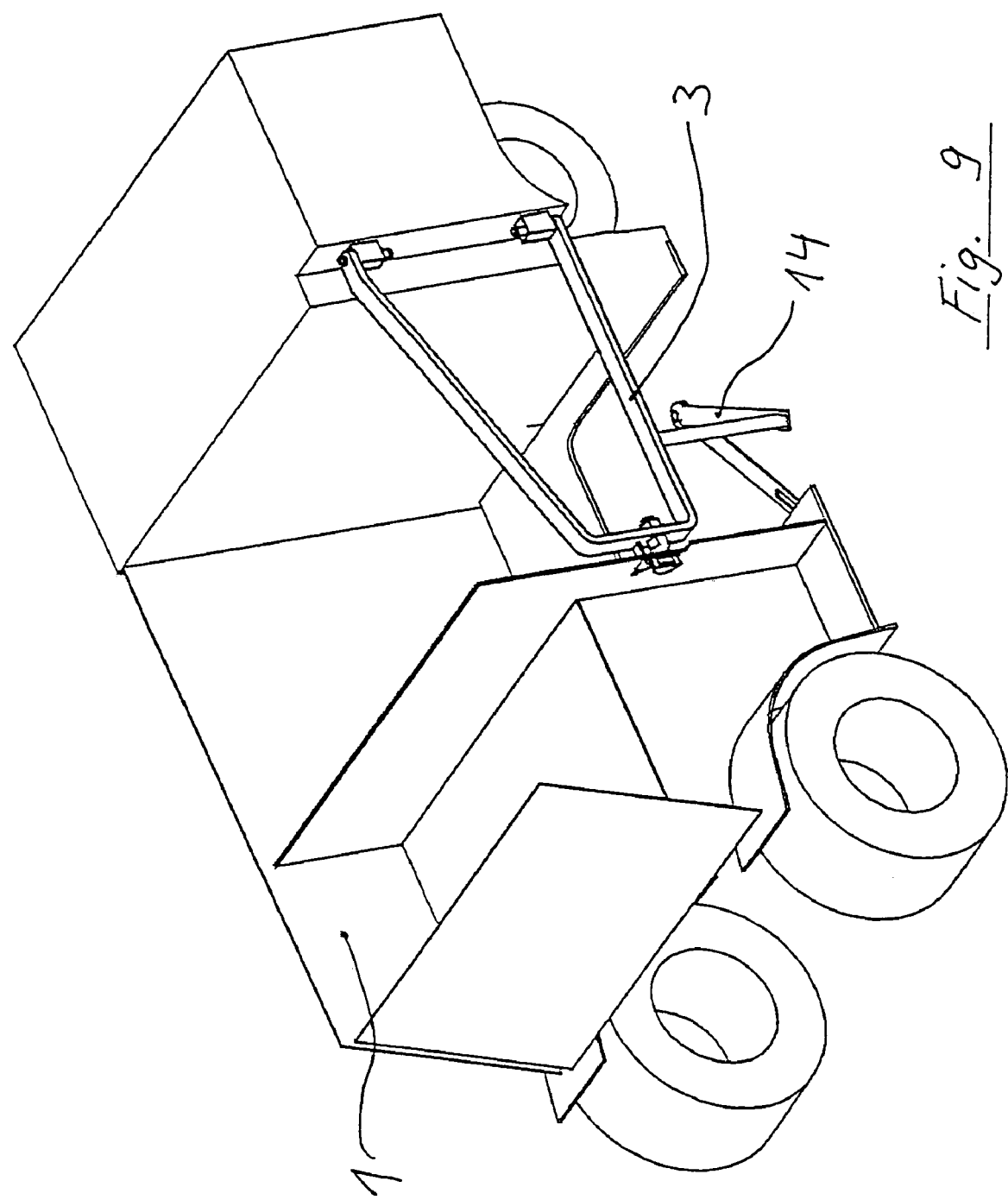
FIG. 9 shows a perspective view of an industrial truck of the invention with an articulated tie rod with the door closed.

FIGS. 8 and 9 show a development of the invention, in which an articulated tie rod 14 is connected with the door 3 in such a way that the opening movement of the door 3 is limited on reaching a substantially right angle. The frame-reinforcing and therefore relatively stably configured door can therefore be used as an insertion aid for a battery block which is to be installed by a loading gear. A damping device can also be incorporated into the articulated tie rod or its fastening to the vehicle frame 1 or the door 3 in order to intercept impacts of the battery block. Instead of an articulated tie rod, it is also possible to use a (optionally elastic) belt 20, as shown in FIG. 10.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. An industrial truck, comprising:
a vehicle frame comprising a frame portion configured to receive a battery block, wherein the frame portion includes at least an upper frame opening and a lateral frame opening, wherein the lateral frame opening can be covered by a door that is pivotable about a substantially vertical axis, and wherein the door is configured to reinforce the frame and to be locked in a closed position by a force-transmitting locking unit, wherein the industrial truck is a counterweight fork-lift truck,
wherein the locking unit includes a first force-transmission element configured to absorb tensile and pressure forces, and wherein the frame portion includes a lower frame opening directly adjoining the lateral frame opening.

2. The industrial truck according to claim 1, wherein the locking unit includes a second force-transmission element, vertically spaced from the first force-transmission element.

3. The industrial truck according to claim 1, wherein the locking unit includes a leaf spring which is elastically deformable in a longitudinal direction of the vehicle and is fastened to the vehicle frame and, when the door is in the closed position, fixes a locking pin in a transverse direction.

4. The industrial truck according to claim 1, wherein the door is coupled to an articulated tie rod that is pivotally fastened to the vehicle frame and acts to limit movement in a right-angled open position of the door.

5. The industrial truck according to claim 2, wherein at least one of the first and second force-transmission elements is adjustable in a lateral direction and a height direction.

6. The industrial truck according to claim 2, wherein the door is coupled to an articulated tie rod that is pivotally fastened to the vehicle frame and acts to limit movement in a right-angled open position of the door.

7. An industrial truck, comprising:
a vehicle frame comprising a frame portion configured to receive a battery block, wherein the frame portion includes at least an upper frame opening and a lateral frame opening, wherein the lateral frame opening can be covered by a door that is pivotable about a substantially vertical axis, wherein the door is configured to reinforce the frame and to be locked in a closed position by a force-transmitting locking unit, wherein the industrial truck is a counterweight fork-lift truck,
wherein the locking unit includes a first force-transmission element configured to absorb tensile and pressure forces, and
wherein the force-transmission element is adjustable in a longitudinal direction and in a height direction.

8. An industrial truck, comprising:
a vehicle frame comprising a frame portion configured to receive a battery block, wherein the frame portion includes at least an upper frame opening and a lateral frame opening, wherein the lateral frame opening can be covered by a door that is pivotable about a substantially vertical axis, wherein the door is configured to reinforce the frame and to be locked in a closed position by a force-transmitting locking unit, wherein the locking unit includes a force-transmission element configured to absorb tensile and pressure forces, and
wherein the force-transmission element includes a screwed pin connected to the door and a locking pin screwed onto an end of the pin remote from the door, the locking pin configured to engage the vehicle frame or a component connected thereto and thus being fixable in a longitudinal direction of the vehicle.

9. An industrial truck, comprising:
a vehicle frame comprising a frame portion configured to receive a battery block, wherein the frame portion includes at least an upper frame opening and a lateral frame opening, wherein the lateral frame opening can be covered by a door that is pivotable about a substantially vertical axis, wherein the door is configured to reinforce the frame and to be locked in a closed position by a force-transmitting locking unit, and
wherein the locking unit includes a leaf spring which is elastically deformable in a longitudinal direction of the vehicle and is fastened to the vehicle frame and, when the door is in the closed position, fixes a locking pin in a transverse direction.

10. The industrial truck according to claim 9, including an active element which automatically bends the leaf spring on closing and is fastened to the door.

11. The industrial truck according to claim 8, wherein the locking unit includes a lock.

12. The industrial truck according to claim 11, wherein the lock can be unlocked by a Bowden cable.

13. The industrial truck according to claim 11, wherein the lock includes a latch fixed to the frame and which, when the door is in the closed position, can be brought into engagement with an axial extension of the locking pin acting as a locking member.

14. An industrial truck, comprising:
a vehicle frame comprising a frame portion configured to receive a battery block, wherein the frame portion includes at least an upper frame opening and a lateral frame opening, wherein the lateral frame opening can be covered by a door that is pivotable about a substantially vertical axis, wherein the door is configured to reinforce the frame and to be locked in a closed position by a force-transmitting locking unit, and
wherein the frame portion includes a lower frame opening directly adjoining the lateral frame opening.

* * * * *

UNITED STATES PATENT AND TRADEMARK OFFICE
CERTIFICATE OF CORRECTION

| | |
|---|---|
| PATENT NO. | : 7,070,225 B2 |
| APPLICATION NO. | : 10/941647 |
| DATED | : July 4, 2006 |
| INVENTOR(S) | : Herrmann |

It is certified that error appears in the above-identified patent and that said Letters Patent is hereby corrected as shown below:

Column 4, Line 61, Claim 1, "axis, and wherein" should read -- axis, wherein --
See Amendment of February 15, 2006, page 3, Claim 1, Line 5.

Signed and Sealed this

Nineteenth Day of December, 2006

JON W. DUDAS
*Director of the United States Patent and Trademark Office*